(12) United States Patent
Yang et al.

(10) Patent No.: US 10,682,680 B2
(45) Date of Patent: Jun. 16, 2020

(54) IN-SITU CHEMICAL OXIDATION HIGH PRESSURE INJECTION OPTIMIZATION REMEDIATION METHOD FOR SOIL AND GROUNDWATER

(71) Applicant: BCEG ENVIRONMENTAL REMEDIATION CO.,LTD, Beijing (CN)

(72) Inventors: Yuewei Yang, Beijing (CN); Shupeng Li, Beijing (CN); Yue Zhang, Beijing (CN); Fuwang Wang, Beijing (CN); Lili Guo, Beijing (CN); Xiaowei Song, Beijing (CN); Fan Chen, Beijing (CN); Pengcheng Yin, Beijing (CN); Shuangchao Cui, Beijing (CN); Yan Liu, Beijing (CN); Qiang Niu, Beijing (CN)

(73) Assignee: BCEG ENVIRONMENTAL REMEDIATION CO., LTD., Beijing (CN)

( * ) Notice: Subject to any disclaimer, the term of this patent is extended or adjusted under 35 U.S.C. 154(b) by 0 days.

(21) Appl. No.: 16/306,871

(22) PCT Filed: May 16, 2017

(86) PCT No.: PCT/CN2017/084470
§ 371 (c)(1),
(2) Date: Dec. 3, 2018

(87) PCT Pub. No.: WO2017/219790
PCT Pub. Date: Dec. 28, 2017

(65) Prior Publication Data
US 2019/0224729 A1    Jul. 25, 2019

(30) Foreign Application Priority Data

Jun. 23, 2016 (CN) .......................... 2016 1 0461742

(51) Int. Cl.
*B09C 1/00* (2006.01)
*B09C 1/08* (2006.01)
(Continued)

(52) U.S. Cl.
CPC .................. *B09C 1/08* (2013.01); *B09C 1/00* (2013.01); *C02F 1/008* (2013.01); *C02F 1/72* (2013.01);
(Continued)

(58) Field of Classification Search
CPC ....................................................... B09C 1/00
See application file for complete search history.

(56) References Cited

U.S. PATENT DOCUMENTS

| 5,639,182 A | 6/1997 | Paris |
| 5,813,798 A * | 9/1998 | Whiffen ..................... B09C 1/00 210/739 |

FOREIGN PATENT DOCUMENTS

| AU | 4557601 A | 9/2001 |
| CN | 103909091 A | 7/2014 |

(Continued)

*Primary Examiner* — Janine M Kreck
(74) *Attorney, Agent, or Firm* — Muncy, Geissler, Olds & Lowe, P.C.

(57) ABSTRACT

An in-situ chemical oxidation high pressure injection optimization remediation method for soil and groundwater. A field test determines the diffusion radius of the injection agent in a typical formation, the maximum single-hole grouting amount per linear meter and the injectability parameter. Density-increased supplementary investigation, soil and groundwater data analysis, is divided by spatial distribution into four concentration main partitions, eight concentration sub-partitions. By optimizing the single-hole grouting amount per linear meter, the preparation concentration of the oxidant, and the parameters of the formulation of each partition, the optimization of the dosing ratio of remediation agent of each partition is achieved. The specific (Continued)

construction performance is to adjust the lifting speed of the high pressure injection drill pipe during the injection process for finally achieve the purpose of reducing the dosing ratio parameters of the agent in the remediation plot.

3 Claims, 4 Drawing Sheets

(51) Int. Cl.
*C02F 1/74* (2006.01)
*C02F 1/00* (2006.01)
*C02F 1/72* (2006.01)
C02F 103/06 (2006.01)

(52) U.S. Cl.
CPC ............ *C02F 1/74* (2013.01); *B09C 2101/00* (2013.01); *C02F 2103/06* (2013.01)

(56) References Cited

FOREIGN PATENT DOCUMENTS

| | | | |
|---|---|---|---|
| CN | 104815844 | A | 8/2015 |
| CN | 105149335 | A | 12/2015 |
| CN | 204892552 | A | 12/2015 |
| CN | 105964677 | A | 9/2016 |
| EP | 1292403 | A1 | 3/2003 |
| WO | WO 0168282 | A1 | 9/2001 |

\* cited by examiner

IN-SITU CHEMICAL OXIDATION HIGH PRESSURE INJECTION OPTIMIZATION REMEDIATION METHOD FOR SOIL AND GROUNDWATER

TECHNICAL FIELD

The present invention relates to an in-situ chemical oxidation high pressure injection optimization remediation method for soil and groundwater, belongs to the technical field of soil and groundwater in-situ remediation method.

BACKGROUND

Soil and groundwater environments are an important part of the ecosystem. In recent years, with the global industrialization process, China's soil contamination has become increasingly serious, wherein organic contamination has become one of the important types of contamination, which not only destroys the ecological environment itself, but directly or indirectly endangers the environment and human health and safety. More seriously, volatile and semi-volatile organic contaminants migrate to deep saturated regions (aquifers) in unsaturated regions (aeration zones), which especially threatens the groundwater resources with serious consequences.

At present, the commonly used soil and groundwater remediation engineering techniques are divided into two methods: in-situ remediation and ex-situ remediation. Ex-situ remediation is easy to cause leakage and spread of contaminants due to its correlation to excavation, transportation, remediation of different places for contaminated soil and pump & treat of groundwater. The important reason for the in-situ remediation technology being favored is that it can solve the problem of deep soil and groundwater contamination, avoiding problems such as deep foundation pit excavation, precipitation and secondary pollution, and greatly improving safety and economy.

Since the mid-1980s, the United States has invested heavily in soil and groundwater remediation, and some new in-situ remediation technologies have emerged. In-Situ Chemical Oxidation (ISCO) technology adds chemical oxidants to soil and groundwater to oxidize contaminants in groundwater to relatively less toxic products (such as carbon dioxide, water, or chloride ions) for the purpose of remediation. This type of technology can process multiple contaminants at the same time, and the treatment efficiency is high, and chemical oxidation is generally not limited by the concentration of contaminants. Commonly used chemical oxidizing agents include Fenton's reagent, potassium permanganate, ozone, activated persulfate, and the like, which can remedy organic pollutants such as benzene, nitrobenzene and petroleum hydrocarbons in soil and groundwater. Factors affecting in-situ chemical oxidation techniques include: the diffusion of oxidants in groundwater, the type of oxidant, the amount of oxidant added, the type and concentration of contaminants, and so on.

In-situ injection requires the design of two important parameters: a) injection points (drilling holes) distribution manner and parameters (mechanical cost); b) design of agent dosing ratio (agent cost). The design of the agent dosing ratio is one of the most critical design parameters for in-situ chemical oxidation remediation.

Due to the peculiarities of the physicochemical properties of volatile/semi-volatile (VOCs/SVOCs) organics, they are often present in the soil and groundwater in the states of adsorption, dissolved state, gas phase (relative proportion of saturated soil layer is small), and free phase, and there is a certain degree of migration and transformation therein. Therefore, the distribution of these organic contaminants in different formation is poor in uniformity. Considering that most organic contaminants have certain solubility, they have a certain distribution in groundwater. The migration law of contaminants in soil and groundwater is related to soil organic matter content, soil permeability, soil structure and properties (such as soil density, compactness, porosity), characteristics of soil layer stratification (such as partial inclusion of thin interlayer or lens body), characteristics of contaminants (solubility, vapor pressure, Henry's constant, soil-water distribution coefficient, etc.).

According to the Technical Guidelines for Site Environmental Investigation (HJ25.1-2014), the most basic requirements for the original site survey sampling unit are designed to be no more than 1600 $m^2$ (40 m×40 m grid). The specification of the unit is far from enough for the design of the post-remediation project, plus the factors such as insufficient attention and cost constraints in the previous site investigation, the input work amount in the investigation stage is small, and the large-scale soil and groundwater remediation project is lacking in the contamination data obtained from the original site investigation, so that it is difficult to guide the remediation and refinement construction. This is often insufficient to support the optimization design of the in-situ chemical oxidation engineering process parameters of the remediation project, resulting in pressures and risks in the construction period, cost, etc. In particular, for construction in heavily contaminated regions, the dosing design of agent has great remediation risks and economic risks. Due to the complexity of hydrogeology, and differences in concentration and distribution of organic contaminants, it is urgent to identify the concentration partition spatially for key plots/regions of large contaminated sites through density-increased supplementary investigation thereby guiding the optimization of engineering remediation design parameters.

There are two main ways of in situ dosing for in-situ chemical oxidant remediation agents: agitation and infusion/injection, wherein in-situ infusion/injection is divided into: Geoprobe drill bit high pressure injection, well-building injection (PVC injection well), Chemgrout grouting technology, In-situ deep mixing grouting technology and other geotechnical grouting techniques.

U.S. Pat. No. 5,639,182, "Soil In-situ Remediation Method" relates to an in-situ soil mixing method, wherein a mobile crawler rig equipped with a vertically driven impeller bit that allows for in-situ mixing of contaminated soil. The mixing drill bit employed is an integrated impeller bit, so the mixing depth is limited and the resistance is large. The application has certain limitations and is only suitable for the treatment of looser formations. It is difficult to achieve adjustment of the agent dosing parameters of vertical depth by the mixing technique.

In-situ drill bit direct pressure injection is to inject the prepared agent into the contaminated soil layer through the injection drill bit under a certain pressure and continuously mix uniformly the contaminated soil with the oxidizing agent to remedy the contaminated soil and groundwater. Two chemically oxidized in-situ drill injection remediation systems are disclosed in U.S. Patent No. US 2002/0143226 A1 and U.S. Pat. No. 6,457,905. Both remediation systems inject chemical oxidants into contaminated soil through augers or injection drill bits.

Well-building injection technique: in Chinese invention patents such as Application No. 201410387735.4 "An organic contaminated soil and groundwater in situ remediation device and remediation method", Application No. 201410615166.4 "An in-situ chemical oxidation injection device for the remediation of contaminated soil and groundwater", a well-building injection in-situ chemical oxidation remediation technique is mentioned, and a remediation method for the injection well in the remediation area is required before the remediation. These two inventions use the intermittent injection method, which can not control and realize the optimal design and implementation of the dosing ratio of the remediation agent in the vertical depth direction of the soil layer.

A chemical oxidation injection well injection system is disclosed in U.S. Patent No. US 2003/0069142. The device is provided with a baffle in front of the screen tube containing the solid powder agent, and after the agent in the screen tube dissolves, remediation for the contaminated soil and groundwater is achieved as the groundwater flows to the target area through the baffle. A chemical oxidation in-situ injection well remediation technique is disclosed in U.S. Patent No. US 2008/0174571 A1. The remediation system injects hydrogen peroxide, ozone and compressed air into the ground through injection wells to remedy contaminated soil and groundwater. Both of these inventions make it difficult to control the amount of agent dosing amount in the vertical depth direction.

In the Chinese invention patent of "a chromium-contaminated in-situ remediation method" of application number 201510159423.2, the agent dosing parameters are obtained according to parameters such as the overlap ratio (the ratio of the area overlapped between the adjacent injection points and the coverage area S of the injection point) calculated by the coverage area of the injection dilling hole, and the number of hole distribution in the injection point. The disadvantage of this calculation method is that the overlap ratio parameter cannot be measured in the engineering implementation, and the agent dosing parameter is not considered to be optimized in the vertical depth direction.

In the Chinese invention patent of "Method for removing chlorine olefins in water by in-situ chemical oxidation", application number 201410148583.2, the use of potassium permanganate to remove organic compounds such as trichloroethylene (TCE) and tetrachloroethylene (PCE) in water with the aid of surfactants is mentioned. Although the removal rate is high, the engineering operability is poor and it is not suitable for the combined contamination of soil and groundwater.

The application process of the above remediation technology requires a series of in-situ remediation systems and processes to optimize the dosage of the remediation agent.

SUMMARY OF THE INVENTION

The purpose of the present invention is to solve the followings: at present, in the domestic soil and groundwater in-situ remediation project, there are widespread problems of insufficient contamination data in the original site investigation of being difficult to solve the optimization design of the hole distribution parameters, the grouting parameters (agent injection parameters) and the agent (oxidant) dosing ratio of the in-situ injection of soil and groundwater remediation in key contaminated plots due to the lack of the detailed data of main target contaminants in the in-situ chemical oxidation remediation construction. The existing in-situ chemical oxidation in-situ injection remediation system and method are difficult to solve the problem of optimization design and remediation agent residue of soil and groundwater remediation engineering of complex organic contamination plots. Further, an in-situ chemical oxidation high pressure injection optimization remediation method for soil and groundwater is provided.

The object of the present is realized by the following technical schemes:

An in-situ chemical oxidation high pressure injection optimization remediation method for soil and groundwater,
  step one: field test to determine the diffusion radius of main typical formation, the maximum single-hole grouting amount per linear meter, and the injectability parameter under in-situ chemical oxidation high pressure rotary injection conditions:
    a) the test conditions are: adopting a gas and liquid double tube process with on a high injection pressure of 25-30 Mpa and an air pump pressure of 0.7-0.8 Mpa for air compressor; the injection agent adopting a solution prepared by a persulfate (referred to as K agent) and a liquid alkali activator;
    b) determining the diffusion radius of in-situ injection remediation according to the distribution characteristics and laws of the formation: according to the previous test data for diffusion radius and experiences, determining the diffusion radius of in-situ injection remediation agent of the plot to be remedied, and determining the diffusion radius of the plot from top to bottom based on the permeability of the most unfavorable formation;
    c) analysis of maximum agent injection amount (injectability) and determination of the injectability parameter α: the mobile porosity and the injectability parameter satisfying the following formula:

$$V_{inj}=\pi R_0^2 h \theta_{mov} \times 1000 \quad (1)$$

$$V_v=\pi R_0^2 h \theta_1 \times 1000 \quad (2)$$

$$\alpha=(\theta_m/\theta_1)\times 100\% \quad (3)$$

wherein, $V_{inj}$—maximum grouting amount, L/m; $V_v$—pore volume per unit aquifer, L/m; $R_0$—effective diffusion radius of the agent, m; h—single-hole linear meter grouting segment, taking h=1 m; $\theta_1$—total porosity, dimensionless; $\theta_m$—mobile porosity, the volume of activated pore obtained due to groundwater flow, dimensionless; α—injectability parameter, the ratio of mobile porosity to total porosity, indicating that the higher the value, the higher the injectability, %, this parameter providing a theoretical basis for the design of the single-hole grouting amount for single-round injection;

step two: injection point distribution: according to investigation data of the original site (soil bore histogram, groundwater monitoring well bore histogram, engineering geological section), distributing the hole distribution parameters L (hole spacing, perpendicular to the groundwater flow direction), B (row spacing, along the groundwater flow direction) of in-situ injection points (drilling holes) according to the triangle method, determining the hole distribution density (points/100 m²) of the remedied plot;

step three: density-increased supplementary investigation: if the contamination concentration data of the key contaminated plot is insufficient to support the optimal design of in-situ chemical oxidation remediation before the organic contaminated site is remedied, an density-increased supplementary investigation is required, the grid setting for the supplementary investigation following the following two principles:

a) the density-increased supplementary investigation smaller than the original site investigation grid, the density-increased supplementary investigation grid is ½~¼ (e.g., using 20*20 m~10 m*10 m) of the original site investigation grid (typically 40 m*40 m), the value taken according to the complex situation of site contamination distribution (the more complex the site, the smaller the value);

b) in the case where the grid division satisfies condition a), while considering the row spacing setting for hole distribution of the in-situ injection high pressure rotary jet injection injection points, a number of row spacings of integral multiples are used to facilitate the late in-situ remediation construction optimization design and partition construction;

step four: analysis of soil and groundwater investigation results: combining the concentration data of the main target contaminants from the original site investigation and the density-increased supplementary investigation for analysis, counting the concentration range and laws of soil target contaminants in a single grid region determined in step three, determining the characteristic concentration (may reflect the general level of concentration in the region) data range of the main target contamination of a single grid and the distribution characteristics and laws at the vertical depth;

step five: refined partitioning, optimization of grouting parameter (agent formulation, concentration of oxidant, single-hole grouting amount, comprehensive dosing ratio of agent):

spatial partitioning is based on plane and depth partitioning while considering remediation depth, high pressure rotary jet grouting drill pipe parameters, groundwater distribution characteristics, and the refined partitioning is: four main concentration partitions and eight sub-concentration partitions, specifically:

a) plane star partitioning (main concentration partition): according to the conclusion from the investigation and analysis determined in step four, the characteristic concentrations of main target contaminants determined in a single grid are counted, classified and combined, and according to the spatial concentration difference of contaminants in the soil, the construction region of in-situ injection points is divided into *, , *, **** concentration partitions, a total of four main concentration partitions, according to the main target contaminant concentration from low to high, and the grouting parameters in four main concentration partitions are optimized as follows: the same main partition uses the same oxidant concentration, injection agent solution/slurry formulation;

b) two-segment partitioning at vertical depth (sub-concentration partition): divided into two depth intervals according to the significant difference of vertical concentration (dividing the remediation depth H into upper and lower segments according to the depth of H1), namely the first sub-layer of the main partition (lower segment, H~H1) and the second sub-layer of the main partition (upper segment, H1~0); the grouting parameters in four main concentration partitions are optimized as follows: the same main partition uses the same oxidant concentration, injection solution/slurry formulation; the grouting parameters in eight sub-concentration partitions are optimized as follows: each drilling hole in the same main partition uses the same single-hole grouting amount, the first sub-layer and the second sub-layer use different single-hole grouting amounts per linear meter from the bottom to the top, which is realized during the construction by adjusting the lifting speed of the high pressure injection rotary jet drill pipe;

step six: in-situ chemical oxidation in-situ injection (high pressure rotary jet injection) remediation operation and partition construction according to the main partition has the following steps:

a) the high pressure rotary jet in-situ injection construction conditions are the same as the test conditions a) in step one; according to the representative contaminant concentration of each main partition, the corresponding single-hole grouting amount ($m^3$/hole) and the grouting amount per linear meter (L/m) are designed, and the injection points of each main partition during the construction are separately numbered to facilitate construction record and identification;

b) each concentration sub-partition of the same concentration main partition (with the same star) must use the same agent formulation, that is, the injection agent solution/slurry uses the same oxidant concentration (fixed oxidant concentration);

c) each concentration sub-partition of the different concentration main partitions uses different agent formulations (each formulation may also be the same), that is, the injection agent solution/slurry uses different oxidant concentrations (may also be the same);

d) the single-hole grouting amount parameter per linear meter (L/m) of each concentration sub-partition is optimized as: *(V1, V2), (V3, V4), *(V5, V6), ****(V7, V8), that is, the single-hole grouting amount per linear meter (L/m) of each main concentration partition uses parameters of two different values according to the vertical contamination distribution (both may take the same value); during construction, it is manifested as: after completing the single-hole lower segment (H~H1) agent injection operation, the lifting speed of the high pressure grouting drill pipe requires to be adjusted to complete the agent injection operation of the single-hole upper segment (H1~0);

e) different in-situ injection high pressure rotary jet equipments are put into different main partitions for construction, and the same equipment may not be cross-worked between different main partitions;

step seven: optimization of comprehensive agent dosing ration for in situ chemical oxidation high pressure rotary injection partitions:

a) optimization process and characteristics of single-hole grouting amount parameters: optimized by main partitions as: * (V1, V2),  (V3, V4), * (V5, V6), **** (V7, V8), values of V1~V8 are adjusted according to the range of the injectability parameters determined in step one and optimized by counter-calculating the ratio of the agent and the preparation concentration of the injection oxidant to meet the requirements for the theoretical calculation of the agent dosing ratio design value;

b) the agent dosing ratio of each partition is calculated as follows:

\*partition:

$$C1\% = \frac{N1*K1\%*[V1*(H-H1)+V2*H1]}{V*1*A1*H*\rho} \quad (4)$$

\*\*partition:

$$C2\% = \frac{N2*K2\%*[V3*(H-H1)+V4*H1]}{V*A2*H*\rho} \quad (5)$$

\*\*\*partition:

$$C3\% = \frac{N3*K3\%*[V5*(H-H1)+V6*H1]}{V*1*A3*H*\rho} \quad (6)$$

\*\*\*\*partition:

$$C4\% = \frac{N4*K4\%*[V7*(H-H1)+V8*H1]}{V*1*A4*H*\rho} \quad (7)$$

wherein A, A1, A2, A3, and A4 are the entire research plots, \*, \*\*, \*\*\*, \*\*\*\* main partition corresponding remediation area with unit: m²; N1, N2, N3, and N4 are the number of high pressure rotary jet in-situ injection points corresponding to \*, \*\*, \*\*\*, \*\*\*\* main partitions, respectively, temporarily according to one injection round, unit: points (drilling holes); V1, V3, V5, and V7 are the single-hole grouting parameters per linear meter of the first sub-layer of \*, \*\*, \*\*\*, \*\*\*\* main partitions (lower segment, H~H1), unit: L/m; V2, V4, V6, and V8 are the single-hole grouting parameters per linear meter of the second sub-layer of \*, \*\*, \*\*\*, \*\*\*\* main partitions (upper segment, H1-0), unit: L/m; K1%, K2%, K3%, and K4% are the oxidant (persulfate, referred to as k agent) preparation concentrations (mass percentage) corresponding to \*, \*\*, \*\*\*, \*\*\*\* main partitions, unit: dimensionless; the formula for the four main partitions is Formulation 1~Formulation 4, and the specific gravity of the solution preparing oxidant is assumed to be 1, unit: dimensionless; V is the volume of the single-pot solution of the agent dispensing station, unit: m³, generally taking 3 m³; ρ is the soil density, unit: t/m³, generally taking 1.6~1.8 t/m³;

c) the overall dosing ratio of the oxidant for the entire plot is calculated as follows:

$$C0\% = \frac{C1\%*A1+C2\%*A2+C3\%*A3+C4\%*A4}{A}. \quad (8)$$

In step one, the range of single-hole grouting amount parameter per linear meter for in-situ chemical oxidation high pressure rotary jet injection remediation determined the field test is as follows: a value of 150~400 L/m for clay type (e.g., silty clay); a value of 500~1200 L/m for sand type (e.g., fine sand); the range of parameters for mobile porosity: a value of 0.06~0.16 L/m for clay type (e.g., silty clay); a value of 0.02~0.05 L/m for sand type (e.g., fine sand); the range for injectability parameters: a value of 20%~52% for clay type (e.g., silty clay); a value of 6%~15% for sand type (e.g., fine sand).

In step seven, for calculation of parameters of dosing ratio of oxidant in each partition, a) calculating the theoretical value according to the molar ratio of the characteristic concentration of the main target contaminants obtained in step 4 to the oxidation reaction of the K agent, while comprehensively considering the factors affecting the concentration distribution of contaminants in groundwater, the distribution coefficient of soil-to-water, and the chemical oxidation of SOD for soil, counter-calculating and slightly adjusting, to obtain the grouting amount parameters (single-hole grouting amount and grouting amount per linear meter, L/m) of each partition, the theoretical value being optimized to the design value; b) the optimization of the grouting amount parameters of each star partition is actually an counter-calculation process, specifically, according to the characteristic concentration of the main target contaminants in each partition, after theoretical calculation, the optimization and adjustment of the dosing ratio of the agent dispensing station and the single-hole grouting parameters are performed to facilitate construction and operation, the single-hole grouting amount being optimized to an integral multiple of 500 L.

The beneficial effects of the present invention are:

1. The problem of the maximum grouting amount of in-situ injection of saturated soil/groundwater is essentially the problem of injectability, that is, how to determine the mobile porosity and the injectability parameters of the saturated layer of a specific site. Due to the significant difference in soil structure and permeability, the injectability parameters of different formations in the in-situ injection process are significantly different. The injectability parameter provides a theoretical basis for the optimal design of the dosing ratio of the agent. The upper limit of the injectability parameter is the maximum agent dosing ratio of the single-round injection in the case of the maximum preparable concentration of the agent (the highest ratio). When this limit is exceeded, a second round of injection is required (re-injection of the in-situ mechanical construction is required, and the corresponding high pressure injection machinery costs are density-increased). Determining the diffusion radius and the hole distribution parameters, density-increased supplementary investigation grid, refined partitioning (planar partitioning, deep partitioning), injection parameter optimization by optimization of the formation analysis may finally the reduction of comprehensive remediation agent dosing ratio, improving economics while ensuring the remediation effect.

2. Specifically, optimization of agent dosing ratio is performed by adjusting the grouting parameters of the in-situ injection points (drilling holes) of each star partition, the single-hole grouting amount, the grouting amount per linear meter, the formulation and ratio of each partition remediation agent (oxidant+activator). Through the optimization of the dosing ratio of each partition, the optimization of the total agent dosing ratio for the entire plot is realized. Due to the difference in the distribution of contaminants in saturated soil layers (including aquifers), a fine-grained partitioning is formulated for the distribution law of soil layers and the distribution of contaminants, and the stepped optimization of the dosing ratio of the remediation agent is adopted for each partition having a distinctly different law while considering the distribution law of various soil layers and of the concentration of main target remediation contaminants in space (planar and vertical) for dividing according to the vertical concentration. Thereby, the optimization of the agent dosing ratio in each partition is realized, and finally the comprehensive agent dosing ratio of the entire plot is significantly reduced, so the cost of the in-situ remediation is reduced while ensuring the remediation effect.

3. The significance of the optimization of the oxidant comprehensive dosing ratio: on the one hand, improving the economics and reducing the cost of the agent, on the one hand, ensuring the remediation effect while preventing the excess residue of the agent.

(1) oxidation advantage of K agent: compared with hydrogen peroxide (poor safety, fast decomposition, short duration in groundwater), compared with potassium permanganate (poor safety), compared with ozone (gas with limited diffusion).

(2) selection for activation of K agent: the advantage of liquid alkali is that it has a long duration and no secondary pollution; the final pH is close to neutral and the oxidation of divalent iron is prone to trivalent iron precipitation; heating in situ treatment consumes a lot of energy, and hydrogen peroxide reacts too quickly and may not be sustained.

(3) object to which the optimization is applied: there are two significances for the key contaminated plots of soil and groundwater: on the one hand, the remediation area has a large depth of remediation, on the one hand, the degree of contamination is high and the difference is high, and the necessity of optimizing the design is required.

4. The partitioning design considers the spatial distribution difference of the concentration of the main target contaminants; the segmentation design considers factors such as aquifer distribution, in-situ injection drill pipe parameters, facilitation for construction; the depth is optimized in two grades; if optimized as construction in N segments, it is theoretically feasible, but it is not operable. Adjusting the injection amount per linear meter (by adjusting the drilling speed and lifting speed) may achieve the function of optimizing the agent parameters by depth. Injection wells are difficult to precisely control the dosing parameters by depth, so the injection process is prone to preferential flow and short circuit.

BRIEF DESCRIPTION OF THE DRAWINGS

The reference numerals in FIG. 2: 1-*remediation partition, 2-*remediation partition, 3-**remediation partition, 4-*high pressure rotary jet in-situ injection points in remediation partition, 5-high pressure rotary jet in-situ injection points in remediation partition, 6-*high pressure rotary jet in-situ injection points in remediation partition, 7-groundwater flow direction, a-density-increased supplementary investigation grid width parameter with unit of m; L1, L2, and L3 are in-situ injection hole spacing parameters (perpendicular to the groundwater flow direction) of *, *, and ** remediation partitions, respectively, with unit of m; B1, B2, and B3 are in-situ injection row spacing parameters (along the groundwater flow direction) of *, *, and ** remediation partitions, respectively, with unit of m.

EMBODIMENTS OF THE INVENTION

The present invention will be further described in detail below with reference to the accompanying drawings. This embodiment is implemented on the premise of the technical solution of the present invention, and the detailed embodiment is given, but the scope of protection of the present invention is not limited to the following embodiments.

An in-situ chemical oxidation high pressure injection optimization remediation method for soil and groundwater, comprising the following steps:

(1) for the key contaminated plots/regions of soil/groundwater, field test is performed to determine the diffusion radius of main typical formation, the maximum single-hole grouting amount per linear meter, and the injectability parameter under in-situ chemical oxidation high pressure rotary injection conditions:

a) the test conditions are: adopting a gas and liquid double tube process with on a high injection pressure of 25-30 Mpa and an air pump pressure of 0.7-0.8 Mpa for air compressor.

b) determining the diffusion radius of in-situ injection remediation according to the distribution characteristics and laws of the formation: according to the previous test data for diffusion radius and experiences, determining the diffusion radius of in-situ injection remediation agent of the plot to be remedied, and determining the diffusion radius of the plot from top to bottom based on the permeability of the most unfavorable formation. (Embodiment 1, the main formation and the most unfavorable formation of N3-1 are silty clay, so the diffusion radius of the silty clay is selected to be 0.9 m to perform hole distribution design).

c) analysis of maximum agent injection amount (injectability) and determination of the injectability parameter α:

the mobile porosity and the injectability parameter are derived as follows:

$$V_{inj} = \pi R_0^2 h \theta_{mov} \times 1000 \tag{1}$$

$$V_v = \pi R_0^2 h \theta_1 \times 1000 \tag{2}$$

$$\alpha = (\theta_m/\theta_1) \times 100\% \tag{3}$$

wherein, $V_{inj}$—maximum grouting amount, L/m; $V_v$—pore volume per unit aquifer, L/m; $R_0$—effective diffusion radius of the agent, m; h—single-hole linear meter grouting segment, taking h=1 m; $\theta_1$—total porosity, dimensionless; $\theta_m$—mobile porosity, the volume of activated pore obtained due to groundwater flow, dimensionless; α—injectability parameter, the ratio of mobile porosity to total porosity, indicating that the higher the value, the higher the injectability, %, this parameter providing a theoretical basis for the design of the single-hole grouting amount for single-round injection.

The range of single-hole grouting amount parameter per linear meter: a value of 150~400 L/m for clay type (e.g., silty clay); a value of 500~1200 L/m for sand type (e.g., fine sand).

The range of parameters for mobile porosity: a value of 0.06~0.16 for clay type (e.g., silty clay); a value of 0.02~0.05 for sand type (e.g., fine sand).

The range for injectability parameters: a value of 20%~52% for clay type (e.g., silty clay); a value of 6%~15% for sand type (e.g., fine sand).

(2) Injection points distribution: according to investigation data of the original site (soil bore histogram, groundwater monitoring well bore histogram, engineering geological section), distributing the hole distribution parameters L (hole spacing, perpendicular to the groundwater flow direction), B (row spacing, along the groundwater flow direction) of in situ injection points (drilling holes) according to the triangle method, determining the hole distribution density (points/100 m²) of the remedied plot.

(3) Density-increased supplementary investigation if the contamination concentration data of the key contaminated plot is insufficient to support the optimal design of in-situ chemical oxidation remediation before the organic contaminated site is remedied, an density-increased supplementary investigation is required. The grid setting for the encrypted survey follows the following two principles:
  a) the density-increased supplementary investigation grid smaller than the original site survey grid, the density-increased supplementary investigation grid is preferably ½~¼ (e.g., using 20*20 m~10 m*10 m) of the original site investigation grid (typically 40 m*40 m), the value taken according to the complex situation of site contamination distribution (the more complex the site, the smaller the value);
  b) in the case where the grid division satisfies condition a), while considering the row spacing setting for hole distribution of the in situ injection high pressure rotary jet injection points, a number of row spacings of integral multiples may be used to ensure uniform distribution of in-situ injection points within a single density-increased supplementary investigation grid and facilitate the late in situ remediation construction optimization design and partition construction.

(4) Analysis of soil and groundwater investigation results: combining the concentration data of the main target contaminants from the original site investigation and the density-increased supplementary investigation for analysis, counting the concentration range and laws of soil target contaminants in a single grid region determined in step three, determining the characteristic concentration (may reflect the general level of concentration in the region) data range of the main target contamination of a single grid and the distribution characteristics and laws at the vertical depth.

(5) Refined partitioning, optimization of grouting parameter (agent formulation, concentration of oxidant, single-hole grouting amount, comprehensive dosing ratio of agent) and construction of refined in situ injection remediation:

Spatial partitioning is based on plane and depth partitioning while considering remediation depth, high pressure rotary jet grouting drill pipe parameters (e.g., the size of a single drill pipe is 3 m), groundwater distribution characteristics. The refined partitioning is: four main concentration partitions and eight sub-concentration partitions.
  a) Plane star partitioning (main concentration partition): according to the conclusion from the investigation and analysis determined in step (4), the characteristic concentrations of main target contamination determined in a single grid are counted, classified and combined, and according to the spatial concentration difference of contaminants in the soil, the construction region of in situ injection point is divided into: *concentration partition (R1, L1, B1, hole distribution density 1), concentration partition (R2, L2, B2, hole distribution density 2), *concentration partition (R3, L3, B3, hole distribution density 3), **** concentration partitions concentration partition (R4, L4, B4, hole distribution density 4), a total of four levels. The remediation areas of the four main partitions are A1~A4. The remediation area satisfies the following formula:

$$A = A1 + A2 + A3 + A4 \quad (1)$$

wherein A, A1, A2, A3, and A4 are the entire research plots, *, , *, **** main partitions corresponding remediation area with unit: m²;

The hole distribution density is defined as the following formula:

$$\text{hole distribution density} = 100 * \left(\frac{Ni}{Ai}\right), \text{ wherein } i = 1, 2, 3, 4 \quad (2)$$

wherein N1, N2, N3, and N4 are the number of high pressure rotary jet in-situ injection points corresponding to *, , *, **** main partitions, respectively, temporarily according to one injection round, unit: points (drilling holes).

b) Two-segment partitioning at vertical depth (sub-concentration partition): divided into two depth intervals according to the significant difference of vertical concentration, namely the first sub-layer of the main partition (lower segment, H~H1) and the second sub-layer of the main partition (upper segment, H1~0). The specific partitioning information is shown in Table 1. The remediation depth satisfies the following formula:

$$H = (H - H1) + (H1 - 0) \quad (3)$$

wherein H is the maximum remediation depth, and H1 is the optimized sub-layer depth; H~H1 is the first sub-layer, the lower segment; H1~0 is the second sub-layer, the upper segment;

the optimization of grouting parameters for each partition of the repaired plot studied is shown in the following table:

TABLE 1

Table for optimization of grouting parameters of in-situ chemical oxidation high pressure rotary jet injection remediation

| Main concentration partition (planar partitioning) | Each partition Agent Dosing ration (%) | Sub-concentration partition (depth partition) | Depth range (m) | Single-hole grouting amount parameter per linear meter (L/m) | Oxidant Concentrations (%) | Type of formulation for injection solution/slurry | Remarks |
|---|---|---|---|---|---|---|---|
| * | C1 | *-1 | H~H1 | V1 | K1 | Formulation 1 | |
|   |    | *-2 | H1~0 | V2 |    |               | |

TABLE 1-continued

Table for optimization of grouting parameters of in-situ chemical oxidation high pressure rotary jet injection remediation

| Main concentration partition (planar partitioning) | Each partition Agent Dosing ration (%) | Sub-concentration partition (depth partition) | Depth range (m) | Single-hole grouting amount parameter per linear meter (L/m) | Oxidant Concentrations (%) | Type of formulation for injection solution/slurry | Remarks |
|---|---|---|---|---|---|---|---|
| ** | C2 | **-1 | H~H1 | V3 | K2 | Formulation 2 | |
| | | **-2 | H1~0 | V4 | | | |
| *** | C3 | ***-1 | H~H1 | V5 | K3 | Formulation 3 | |
| | | ****-2 | H1~0 | V6 | | | |
| **** | C4 | ****-1 | H~H1 | V7 | K4 | Formulation 4 | C4% is the comprehensive agent dosing ratio in research plots before optimization |
| | | ****-2 | H1~0 | V8 | | | |
| Statistics of entire plots | C0 | | | | | | C0% is the comprehensive agent dosing ratio in research plots after optimization |

Note:
(1) the remediation depth is H, divided into two segments: 0~H1, H1~H, and the grouting (agent injection) parameters are set according to the bottom-up in-situ injection remediation method;
(2) the in-situ injection of the remediation agent (oxidant and activator) into the soil and groundwater is carried out by using a gas and liquid double-tube high pressure rotary jet injection method.

(6) Refinement for in-situ chemical oxidation in-situ injection (high pressure rotary jet injection) remediation operation and partition construction according to the main partition has the following characteristics:

The process of high pressure rotary jet injection adopts a gas and liquid double tube process with the injection conditions: a pressure of the high pressure grouting pump of 25-30 Mpa, and a pressure of the air compressor of 0.7~0.8 Mpa. The injection agent adopts a solution prepared by a persulfate (an oxidant referred to as K agent) and a liquid alkali activator (a certain concentration of NaOH solution), which are simultaneously injected into the remediation target level of soil and groundwater. A certain proportion of activator is added to the preparation of the injection solution to ensure the activation effect, and the soil pH may not be exceeded after the remediation.

a) According to the refined partitioning in Table 1 and the representative contaminant concentration of each main partition, the corresponding single-hole grouting amount ($m^3$/hole) and the grouting amount per linear meter (L/m) are designed. The injection points of each main partition during the construction are separately numbered to facilitate construction record and identification.

b) Each concentration sub-partition of the same concentration main partition (with the same star) must use the same agent formulation, that is, the injection agent solution/slurry uses the same oxidant concentration (fixed oxidant concentration); it is manifested during construction by using the agent dispensing station with the same formulation.

c) Each concentration sub-partition of the different concentration main partitions uses different agent formulations (each formulation may also be the same), that is, the injection agent solution/slurry uses different oxidant concentrations (may also be the same); it is manifested during construction by using the agent dispensing station with different formulations.

d) The single-hole grouting amount parameter per linear meter (L/m) of each concentration sub-partition is optimized as: *(V1, V2), (V3, V4), *(V5, V6), ****(V7, V8), that is, the single-hole grouting amount per linear meter (L/m) of each main concentration partition uses parameters of two different values according to the vertical contamination distribution (both may take the same value). During construction, it is manifested as: after completing the single-hole lower segment (H~H1) agent injection operation, the lifting speed of the high pressure grouting drill pipe requires to be adjusted to complete the agent injection operation of the single-hole upper segment (H1~0);

e) Different in-situ injection high pressure rotary jet equipments are put into different main partitions for construction, and the same equipment may not be cross-worked between different main partitions.

(7) Optimization of comprehensive agent dosing ration for in-situ chemical oxidation high pressure rotary injection partitions (main partition and entire plots):

a) optimization process and characteristics of single-hole grouting amount parameters:
① Optimized by main partitions as: * (V1, V2),  (V3, V4), * (V5, V6), **** (V7, V8), characterized in that values of V1~V8 are adjusted according to the range of the injectability parameters determined in step (1) and optimized by counter-calculating the ratio of the agent and the preparation concentration of the injection oxidant to meet the requirements for the theoretical calculation of the agent dosing ratio design value.

②For calculation of parameters of dosing ratio of K agent in each partition, calculating the theoretical value according to the molar ratio of the characteristic concentration of the main target contaminants obtained in step (4) to the oxidation reaction of the K agent, while comprehensively considering the factors affecting the concentration distribution of contaminants in groundwater, the distribution coefficient of soil-to-water, and the chemical oxidation of SOD for soil, counter-calculating and slightly adjusting, to obtain the grouting amount parameters (single-hole grouting amount and grouting amount per linear meter, L/m) of each partition, the theoretical value being optimized to the design value.

③The optimization of the grouting amount parameters of each star partition is actually an counter-calculation process, specifically, according to the characteristic concentration of the main target contaminants in each partition, after theoretical calculation, the optimization and adjustment of the dosing ratio of the agent dispensing station and the single-hole grouting parameters are performed to facilitate construction and operation, the single-hole grouting amount being optimized to an integral multiple of 500 L.

b) The single-hole grouting amount Q of each partition is calculated as follows:

\* partition:

$$Q1=V1(H-H1)+V2(H1-0) \quad (4)$$

\*\* partition:

$$Q2=V3(H-H1)+V4(H1-0) \quad (5)$$

\*\*\* partition:

$$Q3=V5(H-H1)+V6(H1-0) \quad (6)$$

\*\*\*\* partition:

$$Q4=V7(H-H1)+V8(H1-0) \quad (7)$$

c) The agent dosing ratio of each partition is calculated as follows (C is associated with K):

\*partition:

$$C1\% = \frac{N1*K1\%*[V1*(H-H1)+V2*H1]}{V*1*A1*H*\rho} \quad (8)$$

\*\*partition:

$$C2\% = \frac{N2*K2\%*[V3*(H-H1)+V4*H1]}{V*A2*H*\rho} \quad (9)$$

\*\*\*partition:

$$C3\% = \frac{N3*K3\%*[V5*(H-H1)+V6*H1]}{V*1*A3*H*\rho} \quad (10)$$

\*\*\*\*partition:

$$C4\% = \frac{N4*K4\%*[V7*(H-H1)+V8*H1]}{V*1*A4*H*\rho} \quad (11)$$

wherein A, A1, A2, A3, and A4 are the entire research plots, \*, \*\*, \*\*\*, \*\*\*\* main partition corresponding remediation area with unit: m²; N1, N2, N3, and N4 are the number of high pressure rotary jet in-situ injection points corresponding to \*, \*\*, \*\*\*, \*\*\*\* main partitions, respectively, temporarily according to one injection round, unit: point (drilling hole); V1, V3, V5, and V7 are the single-hole grouting parameters per linear meter of the first sub-layer of \*, \*\*, \*\*\*, \*\*\*\* main partitions (lower segment, H~H1), unit: L/m; V2, V4, V6, and V8 are the single-hole grouting parameters per linear meter of the second sub-layer of \*, \*\*, \*\*\*, \*\*\*\* main partitions (upper segment, H1~0), unit: L/m; K1%, K2%, K3%, and K4% are the oxidant (persulfate, referred to as k agent) preparation concentrations (mass percentage) corresponding to \*, \*\*, \*\*\*, \*\*\*\* main partitions, unit: dimensionless; the formula for the four main partitions is Formulation 1~Formulation 4, and the specific gravity of the solution preparing oxidant is assumed to be 1, unit: dimensionless; V is the volume of the single-pot solution of the agent dispensing station, unit: m³, generally taking 3 m³; ρ is the soil density, unit: t/m³, generally taking 1.6~1.8 t/m³; the recommended value of typical saturated soil in southern China is 1.6 t/m³.

d) The comprehensive agent (oxidant) dosing ratio of the entire plots is calculated as follows:

$$C0\% = \frac{C1*A1*H*\rho + C2\%*A2*H*\rho + C3\%*A3*H*\rho + C4\%*A4*H*\rho)}{A*H*\rho} \quad (12)$$

simplified as, $$C0\% = \frac{C1\%*A1 + C2\%*A2 + C3\%*A3 + C4\%*A4}{A} \quad (13)$$

e) Economic parameters of in-situ chemical oxidation in situ injection of the entire plots: the reduction rate of the oxidant dosing ratio (%).

$$\text{reduction rate of the oxidant dosing ratio } \% = 100*\frac{C4\%-C0\%}{C4\%} \quad (14)$$

wherein C4% is the designed oxidant agent dosing ratio of the key remediation plots studied before optimization, unit: dimensionless; C0% is the designed oxidant agent dosing ratio after optimization, unit: dimensionless.

For key contaminated plots/regions of soil/groundwater in organically contaminated sites, these plots/regions have the following characteristics: large remediation area and depth of remediation, high degree of contamination and significant differences in contamination distribution, and complicated hydrogeological conditions (such as complex formation, shallow and abundant groundwater burial). The technical solution and ideas proposed by the present invention may be used for optimization design and engineering implementation of agent (oxidant) dosing parameters during the in-situ chemical oxidation in situ injection remediation process for soil and groundwater in organic contaminated sites, while having strong engineering operability and significant improvement of economics of in-situ remediation, and broad application prospects and promotion value.

Embodiment 1

The present embodiment is a method optimizing the dosing parameters of remediation agent (oxidant) by applying in-situ chemical oxidation technology of key contaminated plot/region to high pressure rotary jet injection in situ remediation process during organic contaminated soil/groundwater remediation project. The operations that are not specifically described in the present embodiment are performed by referring to the methods already given in the Summary of the Invention, and are not described herein again.

Figure 1:
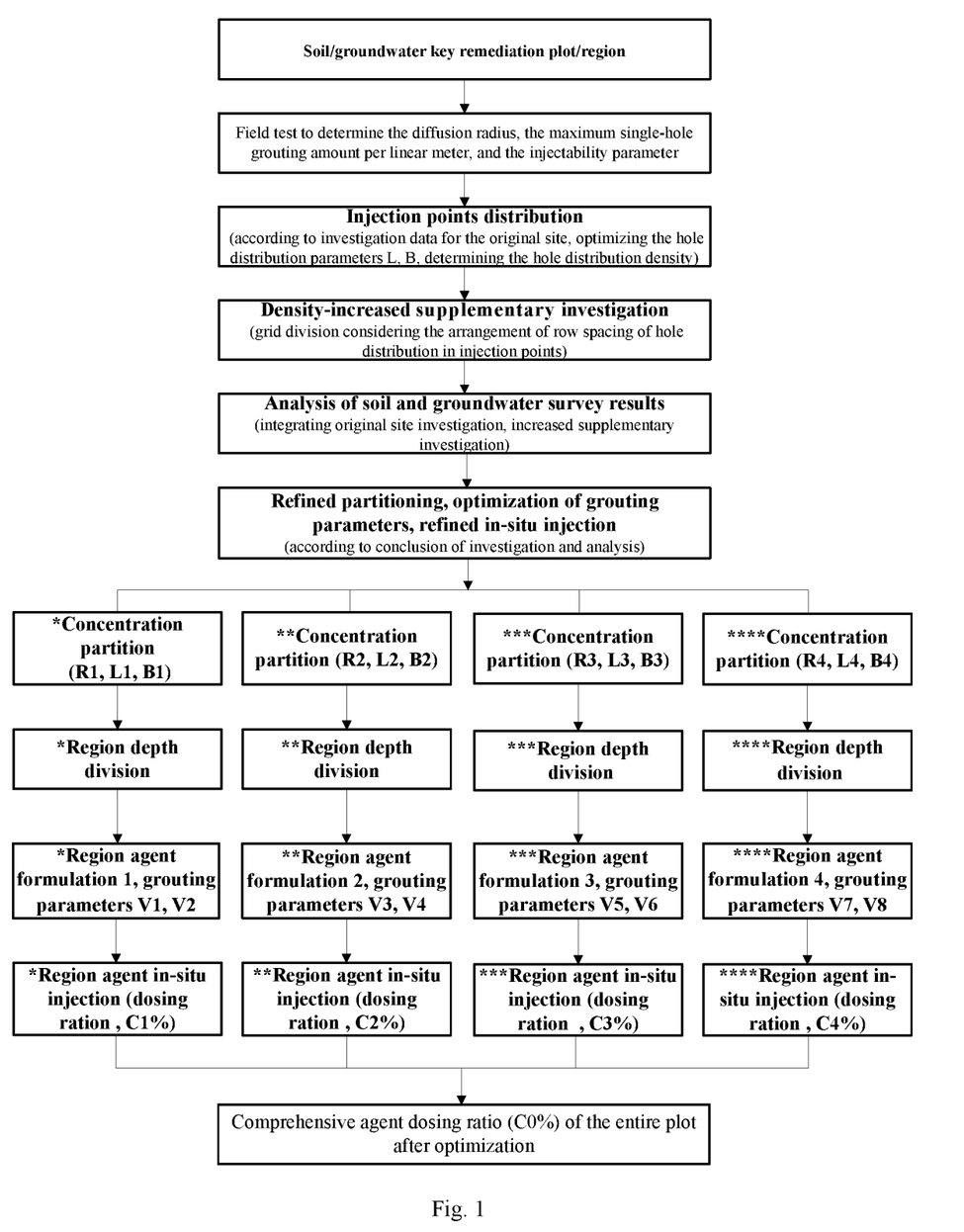
FIG. 1 is a flow chart of an in-situ chemical oxidation high pressure injection optimization remediation method for soil and groundwater in the present invention.
Figure 2:
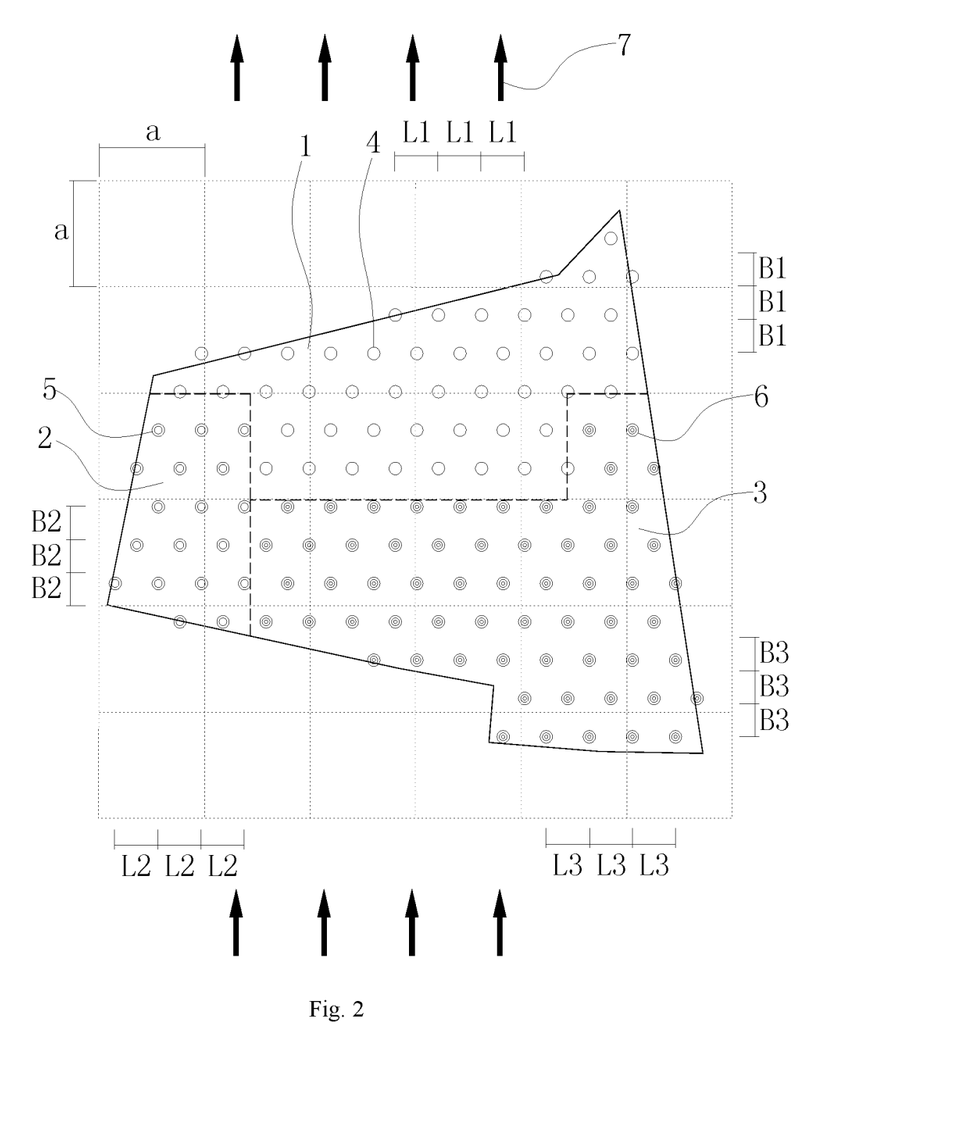
FIG. 2 is a view of optimization partitioning for in-situ chemical oxidation in-situ injection remediation (the density-increased supplementary investigation grid parameters are: 19.2 m*19.2 m).

The present embodiment is specifically as follows:

This project is a soil and groundwater remediation project of a chemical plant in Nanjing. The amount of soil remediation works is 258,000 square meters, and the amount of groundwater remediation works is 170,000 square meters. The target contaminants in soil and groundwater are VOCs/SVOCs organic substances such as chlorobenzene, benzene, and p/o-nitrochlorobenzene. The maximum remediation depth of the soil in this site is 12 m. There are two layers of silty clay layer and the aquifer is fine sand layer (distributed at 3~6 m or 4~7 m). The groundwater is shallow (about 1 m) and rich. One of the difficulties in in-situ remediation of the project is the optimization problem of the chemical oxidant dosing ratio of the key contaminated plots/regions (N3-1, N3-2 plots) and the original site investigation data is not sufficient to support the optimal design of the remediation project. The heavily contaminated plots account for a large proportion, of which soil remediation engineering accounted for 78.73%, and the amount of groundwater remediation works at the same time accounts for 10.0%. According to the investigation results of the original site, the key contaminated plot is also a heavily contaminated land of the project. The main target contaminants in the soil and groundwater are mainly p/o-nitrochlorobenzene with an initial representative concentration above 1000 mg/kg. Therefore, the optimization design of the present embodiment has important significance for the cost of in-situ chemical remediation agent, the remediation effect, and the control of the agent residue, and the optimization design of agent dosing parameters is especially important for large, complex organic contaminated soil and groundwater remediation projects. With combination of FIGS. 1 to 2, taking the remediation depth of 12 m and one of the typical plots (N3-1 plot) in which the main target contaminant is p/o-nitrochlorobenzene in the present project as an example, the steps of optimization for in-situ chemical oxidation high pressure jet injection remediation are briefly described as follows:

(1) a field test determines the diffusion radius, the single-hole grouting amount per linear meter and the injectability parameter of in-situ chemical oxidation high pressure rotary jet injection remediation process; according to the original site investigation data and data, in the depth range of 12 m of the studied plot (N3-1), there are four layers of soil distributed from top to bottom, namely mixed fill (0~2 m), silty clay (2~3 m), fine sand (aquifer 3~6 m), silty clay (6~12 m), and the formation is mainly composed of silty clay and fine sand; considering the permeability of the most unfavorable silty clay, the diffusion radius of the silty clay (taken 0.9 m) is used as the optimization design parameter of the diffusion radius of the plot, and then the hole distribution parameters are determined as follows: according to the triangle method, the hole distance L=1.6 m (perpendicular to groundwater direction, east-west direction), row spacing B=1.4 m (along groundwater direction, north-south direction). According to the silty clay formation, the range for single-hole grouting amount parameter per linear meter is determined: 150~400 L/m; the mobile porosity parameter range is 0.06~0.16; the injectability parameter range is 20%~52%.

(2) Injection points distribution: according to the consideration of the most unfavorable penetrating formation, the plot studied are uniformly distributed according to the hole distribution parameters determined by silty clay, the number of in-situ injection points for in-situ chemical oxidation high pressure jet injection is designed to be N=3067, the entire remediation plot (remediation area A=6628 m$^2$) is covered and the hole distribution density is determined to be 46.27/100 m$^2$.

(3) Density-increased supplementary investigation: the width of the encrypted grid (a) parameter selects the width of 12 times the row spacing of the in-situ injection points (about ½ of the original investigation grid), as shown in the table below.

TABLE 1

| Density-increased supplementary investigation grid parameter | | | |
|---|---|---|---|
| B-row spacing (m) | Grid width (m) | Multiple (—) | Remarks |
| 1.6 | 19.2 | 12 | |

(4) Analysis of soil and groundwater investigation result: after combining the original site investigation and the density-increased supplementary investigation to analyze the sampling results of soil and groundwater, the characteristic concentration range of the main target contaminant para-/n-nitrophenyl chloride for each encrypted grid (19.2 m*19.2 m) is determined, and the depth distribution law of this concentration is analyzed.

(5) Refined partitioning, optimization of grouting parameter (agent formulation, concentration of oxidant, single-hole grouting amount, comprehensive dosing ratio of agent): considering the depth of remediation, high pressure jet grouting drill pipe parameters (3 m length of single drill pipe), groundwater distribution characteristics, and the difference in spatial concentration of target contaminants, the refined partitioning is: the plane star is divided into three main concentration partitions (*, *, ), of which  partition is missing; vertically divided by 6 m depth, divided into 6 sub-concentration partitions. Parameters for characteristic concentration of target contaminants (mg/kg or ppm), area of partition (m$^2$), number of high pressure jet injection points (number), proportion concentration (%) of K agent and formula type are shown in the table below.

The optimization of grouting parameters is specifically shown in the table below.

TABLE 2

Optimization table of grouting parameters for each partition

| Contamination Degree Classification | Partitioning basis (NCB characteristic concentration) | Partition Area (m²) | Injection point Number (number) | First sub-layer: per linear meter Grouting amount (12~6 m) (L/m) | Second sub-layer: per linear meter Grouting amount (6~0 m) (L/m) | Single-hole Grouting amount (m³/hole) | K concentration (%) | K agent dosing ratio before optimization (%) | Formulation type | K agent dosing ratio after optimization (%) |
|---|---|---|---|---|---|---|---|---|---|---|
| * | ≤200 ppm | 2494 | 1154 | 200 | 300 | 3.00 | 14.17 | — | Formulation 2 | 1.03 |
| *** | ≤700 ppm | 931 | 431 | 250 | 250 | 3.00 | 28.33 | — | Formulation 1 | 2.05 |
| **** | ≥1000 ppm | 3203 | 1482 | 300 | 367 | 4.00 | 28.33 | — | Formulation 1 | 2.73 |
| N3-1 Plot Statistics | | 6628 | 3067 | | | | | 2.73 | | 1.99 |

Note: (1) NCB is the abbreviation of the main target contaminant p/o-nitrochlorobenzene in the N3-1 plot, and the diffusion radius is 0.9 m (silty clay); (2) the remediation area of N3-1 plot is 6628 m², the remediation depth is 12 m, and the total amount of soil remediation works is 79,536 m³; (3) the volume of the single-tank agent dispensing station is V=3 m³, and the soil density is ρ=1.6 t/m³.

It can be seen from the above table that the maximum single-hole grouting amount at 12 m depth in the Embodiment 1 is optimized to be 3 to 4 m³.

(6) Calculation of comprehensive agent dosing ration for in-situ chemical oxidation high pressure rotary injection partitions:
according to the formula (8)~(11), the comprehensive dosing ratio of K agent in the main concentration partition (*, *, **) of N3-1 plot studied is: 1.03%, 2.05%, 2.73%, and according to formula (14), the comprehensive ratio of K-agent in N3-1 plot is 1.99%.

Embodiment 2

The present embodiment analyzes and evaluates the remediation effect and economics of in-situ chemical oxidation high pressure rotary jet injection optimization remediation method for target contaminant NCB in soil and groundwater in Embodiment 1.

Figure 3:
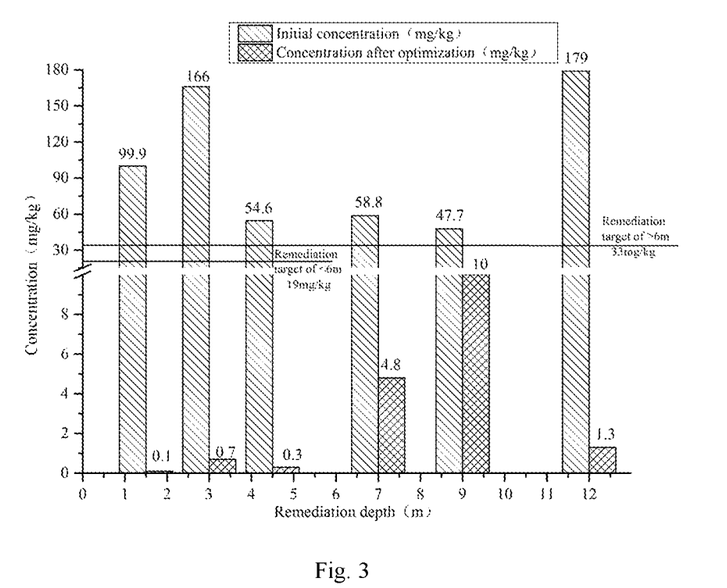
FIG. 3 is a comparison view of remediation effects for in-situ chemical oxidation in-situ injection optimized soil according to Embodiment 1 of the present invention (*partition) (comprehensive dosing ratio of K agent of 1.03%).
Figure 4:
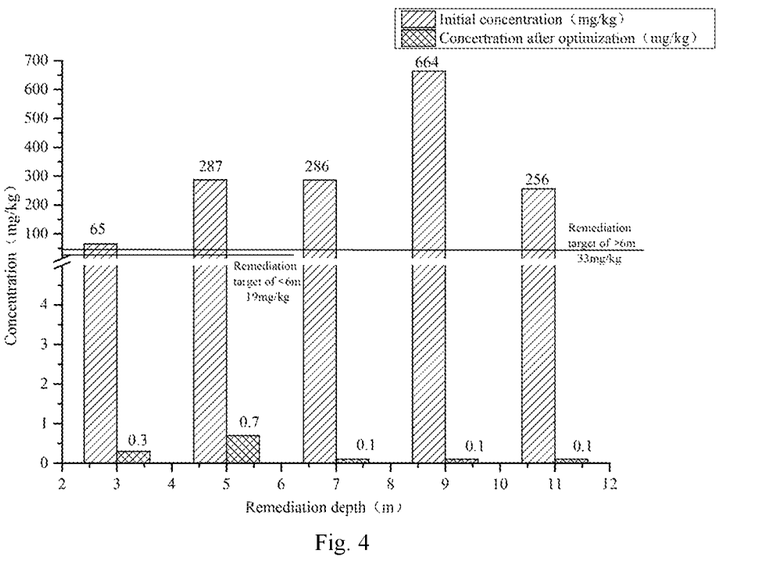
FIG. 4 is a comparison view of remediation effects for in-situ chemical oxidation in-situ injection optimized soil according to Embodiment 1 of the present invention (***partition) (comprehensive dosing ratio of K agent of 2.05%).
Figure 5:
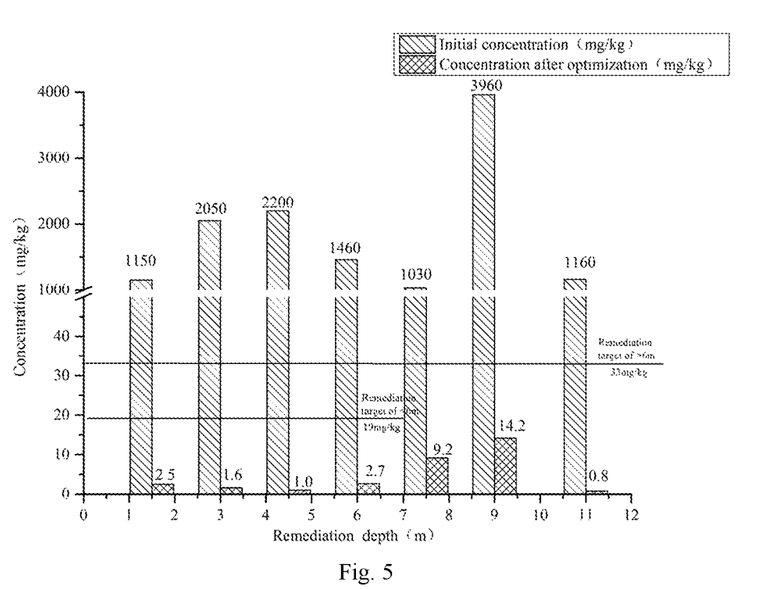
FIG. 5 is a comparison view of remediation effects for in-situ chemical oxidation in-situ injection optimized soil according to Embodiment 1 of the present invention (****partition) (comprehensive dosing ratio of K agent of 2.73%).

1. Evaluation of Soil Remediation Effect:

According to the optimization remediation method described in Embodiment 1, the initial concentration of NCB (original site investigation data or density-increased supplementary investigation data) is compared the concentration of the acceptance test after the optimization remediation, and the soil remediation effect is shown in FIGS. 3 to 5.

The NCB soil remediation standard is optimized from 19 ppm above 5 m and 33 ppm below 5 m to be 19 ppm above 6 m and 33 ppm below 6 m. This is in line with the safety principle and also facilitates partition optimization and construction.

As shown in FIG. 3, in * partition, the K-agent (oxidant) has a dosing ratio of 1.03% after optimization, the NCB of 6 m above and below the soil is significantly reduced after optimization and remediation. These have reached the corresponding soil acceptance criteria and the remediation effect is remarkable.

As shown in FIG. 4, in *** partition, the K-agent (oxidant) has a dosing ratio of 1.52% after optimization, the NCB of 6 m above and below the soil is significantly reduced after optimization and remediation. These have reached the corresponding soil acceptance criteria and the remediation effect is remarkable.

As shown in FIG. 5, in **** partition, the K-agent (oxidant) has a dosing ratio of 2.73% after optimization, the NCB of 6 m above and below the soil is significantly reduced after optimization and remediation. These have reached the corresponding soil acceptance criteria and the remediation effect is remarkable.

2. Analysis for Economic Parameters of In-Situ Chemical Oxidation In-Situ Injection of the N3-1 Plot:

By refining the complex organic contaminated plot (N3-1 plot) into three main concentration partitions of *, *, and **, and the optimization of grouting parameters in each partition, the present embodiment achieves optimization of the dosing parameters of the oxidant (K agent) in the entire plot.

In **** concentration partition, it is manifested by the K agent dosing ratio before optimization (C4%=2.73%) and the total agent dosing ratio of the entire plot after optimization (C0%=1.99%). In essence, this is a process of optimizing C4% to C0%, that is, the reduction rate (%) of the comprehensive dosing ratio of the agent (oxidant) is the economic indicator of the K agent in the project, as shown in the table below.

TABLE 3

Economic indicator of agent dosing ratio

| Before optimization Oxidant dosing ratio (—) | After optimization Oxidant dosing ratio (—) | Reduction rate of oxidant dosing ratio (%) | Remarks |
|---|---|---|---|
| 2.73% | 1.99% | 27.11 | After in-situ chemical oxidation remediation of key contaminated soil/groundwater plots/regions employs the optimization design, dosage of K agent is reduced by nearly one-third, so that economics is significantly improved. |

As can be seen from the above table, by optimization process for density-increased supplementary investigation, injection points distribution, refined partitioning and grouting parameters, the present embodiment finally realizes the optimization of the in-situ chemical oxidation remediation agent dosing parameters of the heavily contaminated plot, and it significantly improves the economics and reduces the cost of the remediation project while ensuring the remediation effect.

The above is only a preferred embodiment of the present invention, and these specific embodiments are based on different implementations under the overall concept of the present invention, and do not limit the protection scope of the present invention, and anyone skilled in the art may easily think of mortifications and alternations within the technical scope disclosed by the present invention, all of which should be contained within the protection scope of the present invention. Therefore, the scope of the present invention should be determined by the scope of the claims.

The invention claimed is:

1. An in-situ chemical oxidation high pressure injection optimization remediation method for soil and groundwater, comprising
   step one: field test to determine a diffusion radius of main typical stratum, a maximum single-hole grouting amount per linear meter, and an injectability parameter under in situ chemical oxidation high pressure rotary injection conditions:
   a) test conditions are: adopting a gas and liquid double pipe process with an injection pressure of 25~30 Mpa and an air pump pressure of 0.7~0.8 Mpa for air compressor; the injection agent adopting a solution prepared by a persulfate and a liquid alkali activator;
   b) determining a diffusion radius of in-situ injection remediation according to stratum distribution: according to previous test data for diffusion radius and experiences, determining the diffusion radius of in-situ injection remediation agent of a plot to be remedied, and determining the diffusion radius of the plot from top to bottom based on permeability of a most unfavorable stratum;
   c) analyzing maximum agent injection amount and determining an injectability parameter α: a mobile porosity and the injectability parameter satisfying the following formula:

$$V_{inj} = \pi R_0^2 h \theta_{mov} \times 1000 \qquad (1)$$

$$V_v = \pi R_0^2 h \theta_1 \times 1000 \qquad (2)$$

$$\alpha = (\theta_m / \theta_1) \times 100\% \qquad (3)$$

wherein, $V_{inj}$—maximum grouting amount, L/m; $V_v$—pore volume per unit aquifer, L/m; $R_0$—effective diffusion radius of the agent, m; h—single-hole linear meter grouting segment, taking h=1 m; $\theta_1$—total porosity, dimensionless; $\theta_m$—mobile porosity, the volume of activated pore obtained due to groundwater flow, dimensionless; α—injectability parameter, a ratio of mobile porosity to total porosity indicates that the higher the value, the higher the injectability, this parameter provides a theoretical basis for a design of the single-hole grouting amount for single-round injection;
   step two: injection point distribution:
   according to investigation data of an original site, distributing hole distribution parameters L, B of in-situ injection points according to a triangle method, determining a hole distribution density of a remedied plot;
   step three: density-increased supplementary investigation:
   if contamination concentration data of a key contaminated plot is insufficient to support an optimal design of in-situ chemical oxidation remediation before an organic contaminated site is remedied, the density-increased supplementary investigation is required, a grid setting for the density-increased supplementary investigation follows the following two principles:
   a) a density-increased supplementary investigation grid is smaller than an original site investigation grid, the density-increased supplementary investigation grid is ½~¼ of the original site investigation grid, taking a value according to a complex situation of site contamination distribution;
   b) in a case where a grid division satisfies condition a), while considering a row spacing setting for hole distribution of in-situ injection points for a high pressure rotary jet injection, a number of row spacings of integral multiples are used to facilitate a late in-situ remediation construction optimization design and partition construction;
   step four: analysis of soil and groundwater investigation results:
   combining concentration data of main target contaminants from the original site investigation and the density-increased supplementary investigation for analysis, counting concentration range and laws of soil target contaminants in a single grid region determined in step three, determining characteristic concentration data range of the main target contamination of a single grid and the stratum distribution at a vertical depth;
   step five: refined partitioning, optimization of grouting parameter:
   spatial partitioning is based on plane and depth partitioning while considering remediation depth, high pressure rotary jet grouting drill pipe parameters, groundwater distribution characteristics, and a refined partitioning is: four main concentration partitions and eight sub-concentration partitions, specifically:
   a) plane star partitioning: according to a conclusion from the investigation and analysis determined in step four, the characteristic concentrations of main target contaminants determined in a single grid are counted, classified and combined, and according to a spatial concentration difference of contaminants in the soil, a construction region of in situ injection point is divided into *, , *, **** concentration partitions, a total of four main concentration partitions, according to the main target contaminant concentration from low to high, and the grouting parameters in four main concentration partitions are optimized as follows: the same main partition uses the same oxidant concentration, injection agent solution/slurry formulation;
   b) two-segment partitioning at vertical depth: divided into two depth intervals according to the significant difference of vertical concentration, namely the first sub-layer of the main partition and the second sub-layer of the main partition; the grouting parameters in four main concentration partitions are optimized as follows: the same main partition uses the same oxidant concentration, injection solution/slurry formulation; the grouting parameters in eight sub-concentration partitions are optimized as follows: each drilling hole in the same main partition uses the same single-hole grouting amount, the first sub-layer and the second sub-layer use different single-hole grouting amounts per linear meter from the bottom to the top, which is realized during a construction by adjusting a lifting speed of a high pressure injection rotary jet drill pipe;
   step six: in-situ chemical oxidation in-situ injection remediation operation and partition construction according to the main partition has the following steps:

a) the high pressure rotary jet in-situ injection construction conditions are the same as the test conditions a) in step one; according to a representative contaminant concentration of each main partition, the corresponding single-hole grouting amount and the grouting amount per linear meter are designed, and the injection points of each main partition during the construction are separately numbered to facilitate construction record and identification;
b) each concentration sub-partition of the same concentration main partition must use the same agent formulation, that is, the injection agent solution/slurry uses the same oxidant concentration;
c) each concentration sub-partition of the different concentration main partitions uses different agent formulations, that is, the injection agent solution/slurry uses different oxidant concentrations;
d) the single-hole grouting amount parameter per linear meter of each concentration sub-partition is optimized as: *(V1, V2), (V3, V4), *(V5, V6), ****(V7, V8), that is, the single-hole grouting amount per linear meter of each main concentration partition uses parameters of two different values according to a vertical contamination distribution; during construction, it is manifested as: after completing the single-hole lower segment agent injection operation, the lifting speed of the high pressure grouting drill pipe requires to be adjusted to complete the agent injection operation of the single-hole upper segment;
e) different in-situ injection high pressure rotary jet equipments are put into different main partitions for construction, and the same equipment may not be cross-worked between different main partitions;
step seven: optimization of comprehensive agent dosing ration for in-situ chemical oxidation high pressure rotary injection partitions:
A) optimization process and characteristics of single-hole grouting amount parameters: optimized by main partitions as: *, , *, ****, values of V1~V8 are adjusted according to the range of the injectability parameters determined in step one and optimized by counter-calculating a ratio of the agent and a preparation concentration of an injection oxidant to meet requirements for theoretical calculation of the agent dosing ratio design value;
b) the agent dosing ratio of each partition is calculated as follows:
* partition:

*partition:

$$C1\% = \frac{N1*K1\%*[V1*(H-H1)+V2*H1]}{V*1*A1*H*\rho} \quad (4)$$

**partition:

$$C2\% = \frac{N2*K2\%*[V3*(H-H1)+V4*H1]}{V*A2*H*\rho} \quad (5)$$

***partition:

$$C3\% = \frac{N3*K3\%*[V5*(H-H1)+V6*H1]}{V*1*A3*H*\rho} \quad (6)$$

****partition:

$$C4\% = \frac{N4*K4\%*[V7*(H-H1)+V8*H1]}{V*1*A4*H*\rho} \quad (7)$$

wherein A, A1, A2, A3, and A4 are the entire research plots, *, , *, **** main partition corresponding remediation area has a unit: $m^2$; N1, N2, N3, and N4 are the number of high pressure rotary jet in-situ injection points corresponding to *, , *, **** main partitions, respectively, temporarily according to one injection round, unit: points; V1, V3, V5, and V7 are the single-hole grouting parameters per linear meter of the first sub-layer of *, , *, **** main partitions, unit: L/m; V2, V4, V6, and V8 are the single-hole grouting parameters per linear meter of the second sub-layer of *, , *, **** main partitions, unit: L/m; K1%, K2%, K3%, and K4% are oxidant preparation concentrations corresponding to *, , *, **** main partitions, unit: dimensionless; formula for four main partitions is Formulation 1~Formulation 4, and a proportion of a solution preparing oxidant is assumed to be 1, unit: dimensionless; V is a volume of a single-pot solution of the agent dispensing station, unit: $m^3$, generally taking 3 $m^3$; $\rho$ is the soil density, unit: $t/m^3$, generally taking 1.6~1.8 $t/m^3$;
c) the overall dosing ratio of the oxidant for the entire plot is calculated as follows:

$$C0\% = \frac{C1\%*A1+C2\%*A2+C3\%*A3+C4\%*A4}{A}. \quad (8)$$

2. The in-situ chemical oxidation high pressure injection optimization remediation method for soil and groundwater according to claim 1, wherein in step one, the range of single-hole grouting amount parameter per linear meter for in-situ chemical oxidation high pressure rotary jet injection remediation determined in the field test is as follows: a value of 150~400 L/m for clay type; a value of 500~1200 L/m for sand type; the range of parameters for mobile porosity: a value of 0.06~0.16 L/m for clay type; a value of 0.02~0.05 L/m for sand type; the range for injectability parameters: a value of 20%~52% for clay type; a value of 6%~15% for sand type.

3. The in-situ chemical oxidation high pressure injection optimization remediation method for soil and groundwater according to claim 1, wherein in step seven, for calculation of parameters of dosing ratio of oxidant in each partition, a) calculating a theoretical value according to a molar ratio of the characteristic concentration of the main target contaminants obtained in step 4 to the oxidation reaction of the K agent, while comprehensively considering factors affecting concentration distribution of contaminants in groundwater, a distribution coefficient of soil-to-water, and chemical oxidation of SOD for soil, counter-calculating and slightly adjusting, to obtain the grouting amount parameters of each partition, the theoretical value being optimized to the design value; b) the optimization of the grouting amount parameters of each star partition is actually an counter-calculation process, specifically, according to the characteristic concentration of the main target contaminants in each partition, after theoretical calculation, the optimization and adjustment of the dosing ratio of the agent dispensing station and the single-hole grouting parameters are performed to facilitate construction and operation, the single-hole grouting amount is optimized to an integral multiple of 500 L.

* * * * *